(12) United States Patent
Fakoorian et al.

(10) Patent No.: US 12,438,680 B2
(45) Date of Patent: Oct. 7, 2025

(54) INTRA-CELL UE-TO-UE CROSS LINK INTERFERENCE MANAGEMENT AT FULL-DUPLEX OPERATION

(71) Applicant: APPLE INC., Cupertino, CA (US)

(72) Inventors: Seyed Ali Akbar Fakoorian, San Diego, CA (US); Wei Zeng, Cupertino, CA (US); Dawei Zhang, Cupertino, CA (US); Xiang Chen, Chaoyang District (CN); Yang Tang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/758,298

(22) PCT Filed: Sep. 24, 2021

(86) PCT No.: PCT/CN2021/120402
§ 371 (c)(1),
(2) Date: Jun. 30, 2022

(87) PCT Pub. No.: WO2023/044783
PCT Pub. Date: Mar. 30, 2023

(65) Prior Publication Data
US 2024/0223343 A1 Jul. 4, 2024

(51) Int. Cl.
*H04L 5/00* (2006.01)
*H04L 5/14* (2006.01)
*H04W 72/541* (2023.01)

(52) U.S. Cl.
CPC .......... *H04L 5/0073* (2013.01); *H04L 5/0048* (2013.01); *H04L 5/0055* (2013.01); *H04L 5/1423* (2013.01); *H04W 72/541* (2023.01)

(58) Field of Classification Search
None
See application file for complete search history.

(56) References Cited

U.S. PATENT DOCUMENTS 11,160,088 B2 * 10/2021 Li ................ H04L 1/0007
2021/0152261 A1 5/2021 Kang et al.
(Continued)

FOREIGN PATENT DOCUMENTS

| CN | 108282879 A | 7/2018 |
|---|---|---|
| CN | 111565401 A | 8/2020 |

(Continued)

OTHER PUBLICATIONS

Extended European Search Report received for European Application No. 21912321.3, mailed on May 15, 2024, 15 pages.

(Continued)

*Primary Examiner* — Luna Weissberger
(74) *Attorney, Agent, or Firm* — Kubota & Basol LLP

(57) ABSTRACT

Methods and systems are disclosed for a UE to manage and measure intra-cell cross link interference (CLI) when served by a base station operating in full-duplex FDD. The signaling may indicate to a victim UE resources to measure to determine the level of CLI from aggressor UEs. The resources used for the CLI measurement may be resources not scheduled by the base station for use by the victim UE for downlink reception, but are scheduled for use by the aggressor UEs for transmitting uplink traffic or for transmitting reference signals used to characterize the uplink channel. The victim UE may report the CLI measurements to the base station for the base station to adjust scheduling of downlink resources to the victim UE. In one aspect, the signaling from the base station may indicate to the victim UE the locations of scheduled downlink symbols that may potentially be impacted by CLI.

20 Claims, 11 Drawing Sheets

(56) References Cited

U.S. PATENT DOCUMENTS

| | | | |
|---|---|---|---|
| 2021/0289374 A1 | 9/2021 | Zhang et al. | |
| 2024/0154771 A1* | 5/2024 | Xu | H04L 5/0073 |
| 2024/0298198 A1* | 9/2024 | Ibrahim | H04W 24/10 |

FOREIGN PATENT DOCUMENTS

| | | | |
|---|---|---|---|
| CN | 111988099 A | 11/2020 | |
| CN | 113261325 A | 8/2021 | |
| CN | 113261326 A | 8/2021 | |
| JP | 2022-520365 A | 3/2022 | |
| SG | 11202106573 W | 7/2021 | |
| WO | 2020/032666 A1 | 2/2020 | |
| WO | 2020/143736 A1 | 7/2020 | |
| WO | 2020/167837 A1 | 8/2020 | |
| WO | 2021/138827 A1 | 7/2021 | |
| WO | WO-2022151073 A1 * | 7/2022 | H04L 1/1812 |

OTHER PUBLICATIONS

International Preliminary Report on Patentability received for PCT Patent Application No. PCT/CN2021/120402, mailed on Apr. 4, 2024, 6 pages.

Intel Corporation, "UE-to-UE CLI measurement and reporting", 3GPP TSG RAN WG1 Ad-Hoc Meeting 1901, R1-1900489, Jan. 21-Jan. 25, 2019, 5 pages.

International Search Report and Written Opinion received for PCT Patent Application No. PCT/CN2021/120402, mailed on Jun. 15, 2022, 7 pages.

Supplementary Partial European Search Report and Search Opinion received for European Application No. 21912321.3, mailed on Feb. 19, 2024, 16 pages.

Search Report received for Chinese Patent Application No. 202180020260.3, mailed on Apr. 9, 2025, 5 pages (2 pages of English Translation and 3 pages of Official Copy).

* cited by examiner

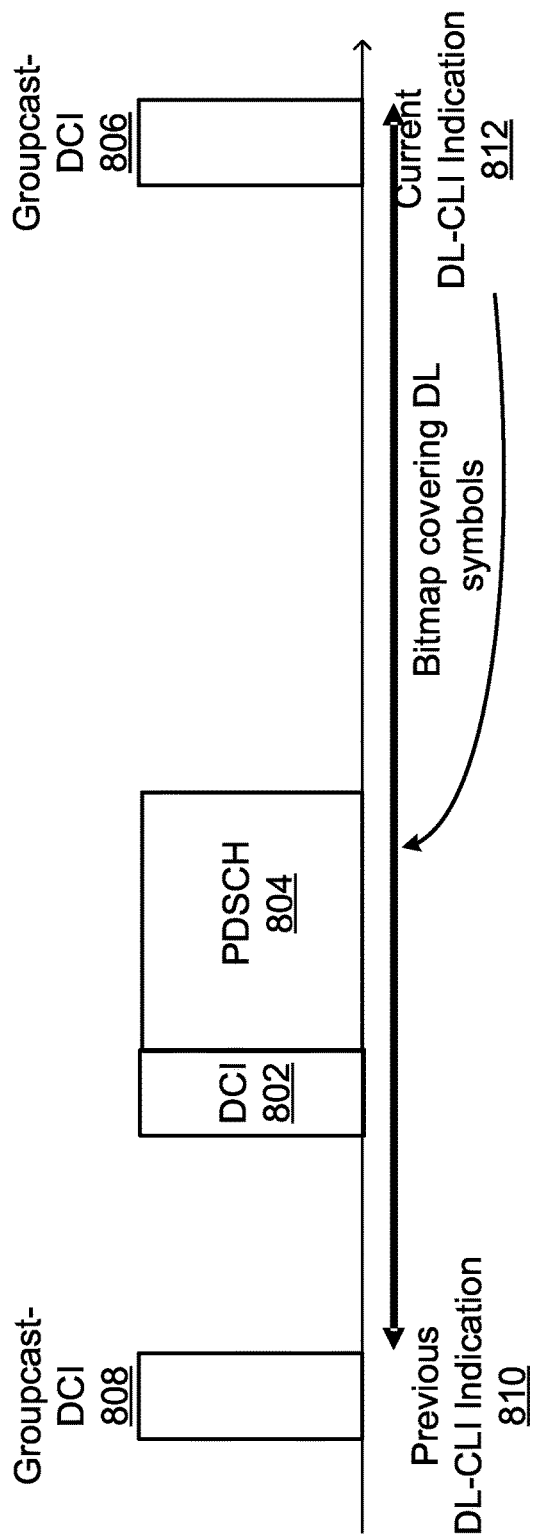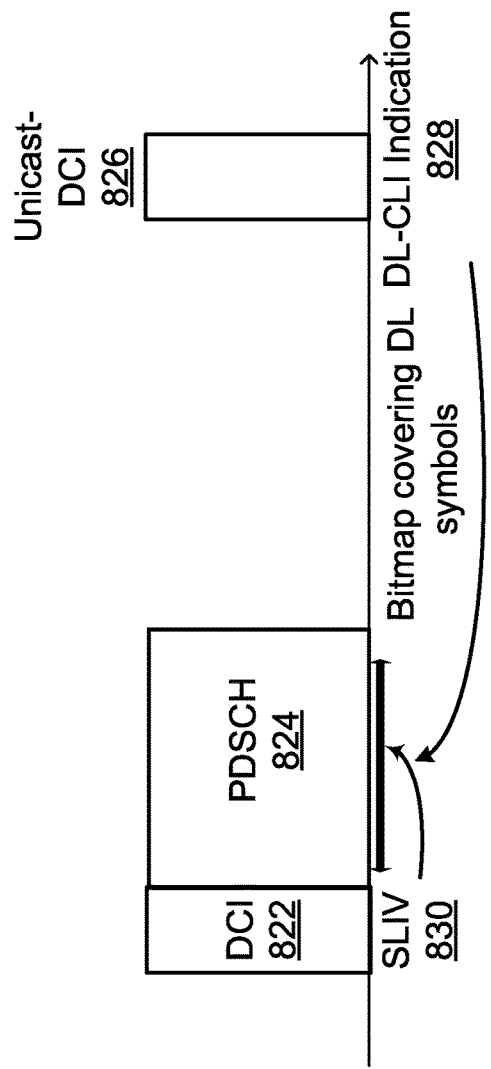
FIG. 8A
FIG. 8B

INTRA-CELL UE-TO-UE CROSS LINK INTERFERENCE MANAGEMENT AT FULL-DUPLEX OPERATION

RELATED APPLICATIONS

The present application is the national phase of International Application No. PCT/CN2021/120402, filed on Sep. 24, 2021 and the disclosure of which is hereby incorporated herein by reference in its entirety.

FIELD OF INVENTION

This invention relates generally to the field of wireless communication, and more particularly, to systems and methods for wireless communication devices to manage and measure cross link interference from other wireless communication devices in an environment when a base station of the communication network serving the wireless communication devices operates in a full-duplex mode. Other aspects are also described.

BACKGROUND OF THE INVENTION

In a wireless communications network, a user equipment (UE) may communicate with a base station of the network by establishing a radio link between the UE and the base station. In the 5G (New Radio or NR) or 4G (LTE) wireless network, a UE may receive signaling and data from the serving base station in a downlink transmission direction or transmit signaling and data to the serving base station in an uplink transmission direction. The duplex mode of operation determines the way in which a radio spectrum allocation is used for the uplink and downlink transmissions. In time division duplexing (TDD) the same RF carrier or band is used for both the uplink and downlink transmissions but with the transmissions in the two directions occurring at different time. 5G supports dynamic TDD to allow rapid reconfiguration of radio resources (e.g., symbols) between uplink and downlink. This allows the base station to adjust the downlink resources according to short term requirements. However, neighboring cells may reconfigure their symbols between uplink and downlink without coordination. One cell may be transmitting in the downlink while a neighboring cell may be receiving in the uplink. This scenario may lead to inter-cell cross link interference (CLI).

In frequency division duplexing (FDD), the uplink and downlink transmissions may use separate RF carriers or bands, enabling simultaneous uplink and downlink transmissions in a full-duplex operation but at a cost of requiring larger radio spectrum. The separate bands allocated for uplink and downlink transmission may be separated by a guard band to minimize interference. FDD may also use partially overlapping or fully overlapping bands or carriers for uplink and downlink but with receiving UEs and transmitting UEs spatially separated. Enhancement to the duplex mode may include full-duplex operation within a TDD band by operating FDD in TDD with the aim to reduce the latency for the uplink transmission. In these different deployments of FDD operation, the base station may operate in full-duplex with some of the UEs served by the base station transmitting in the uplink direction while other UEs served by the base station receiving in the downlink direction. Intra-cell UE-to-UE CLI may arise when the uplink transmission from one UE causes interference to the downlink reception of another UE within the same cell. The UE receiving the downlink transmission may be unaware that other UE within the same cell may be transmitting, with the potential for intra-cell CLI even when the receiving UE and the transmitting UE may be spatially separated. It is desired for a UE when served by a full-duplex base station to minimize interruption when there is intra-cell UE-to-UE CLI.

SUMMARY OF THE DESCRIPTION

Methods and systems are disclosed for a UE to manage and measure intra-cell CLI when served by a base station operating in full-duplex FDD. A UE receiving downlink transmission from the full-duplex base station may experience intra-cell CLI due to uplink transmission from another UE served by the same base station. The downlink receiving UE, referred to as the victim UE, may receive signaling from the base station to measure potential CLI from one or more interfering UEs, also referred to as the aggressor UEs or interfering UEs. The signaling may indicate to the victim UE the timing and frequency of resources that may be measured to determine the level of CLI from aggressor UEs. The resources used for the CLI measurement may be resources not scheduled by the base station for use by the victim UE for downlink reception, but resources scheduled for use by the aggressor UEs for transmitting uplink traffic or for transmitting reference signals used to characterize the uplink channel. The victim UE may report the CLI measurements to the base station for the base station to adjust scheduling of downlink resources to the victim UE or for link adaptation. In one aspect, the signaling from the base station may indicate to the victim UE the locations of scheduled downlink symbols that may potentially be impacted by CLI. The victim UE may determine if the scheduled downlink symbols indicated by the signaling are actually impacted by the CLI or may exclude the indicated symbols from being processed. The operation of the victim UE to measure the CLI or to determine the symbols impacted by the CLI may be determined by the order of downlink resource allocation for the victim UE and uplink resource allocation for the aggressor UE.

In one aspect, when the base station schedules the resources for use by the victim UE after having already scheduled the resources for use by one or more aggressor UEs, the base station may indicate to the victim UE the resources for making CLI measurement. The resources for making CLI measurement may be resources not allocated to the victim UE for downlink reception but may be allocated to potential aggressor UEs for uplink transmission. These resources may occupy reserved resources among the resources allocated to the victim UE for downlink reception. In one aspect, the reserved resources may be null tones such as zero power channel state information reference signal (ZP-CSI-RS). In one aspect, the base station may indicate to the victim UE the metrics or parameters associated with the CLI to be measured and reported. In one aspect, the base station may indicate to the victim UE the uplink resources to be used for reporting the CLI measurement. The victim UE may measure the parameters of the CLI using the reserved resources and may report the CLI measurement to the base station using the indicated uplink resources. Based on the CLI measurements, the base station may adjust its scheduling of future downlink resources to the victim UE.

In one aspect, when the base station schedules the resources for use by the victim UE before scheduling or having knowledge of the resources for use by one or more aggressor UEs, the base station is not able to stop the victim UE from receiving downlink symbols using the scheduled resources but may indicate to the victim UE which downlink symbols may be impacted by CLI from aggressor UEs. The indication of the CLI impacted downlink symbols may be directed to a group of victim UEs or may be specific to a victim UE. A victim UE may receive the downlink symbols using the scheduled resources to determine if the symbols are corrupted or may exclude the symbols indicated as exposed to potential CLI from further processing.

In one aspect, when the base station schedules the resources for use by the victim UE and by the aggressor UE concurrently, the base station may coordinate the transmission of reference signals by one or more aggressor UEs and the measurement of the reference signals by one or more victim UEs to determine the level of CLI. In one aspect, the reference signals may be sounding reference signals (SRS) transmitted by UEs for the base station to measure the uplink channel characteristics. In one aspect, the base station may configure the aggressor UEs and victim UEs with a common set of reference signals. The aggressor UEs may transmit the reference signals on a periodic, semi-persistent, or aperiodic basis. A victim UE may measure parameters of the reference signals upon command by the base station or when triggered by certain events such as when detecting a high level of interference. The base station may indicate to the victim UE resource identification information that associates the reference signals with one or more aggressor UEs. The victim UE may measure the parameters of the CLI using the reference signals and may report the CLI measurement and the aggressor UEs associated with the measured reference signals to the base station. Based on the level of CLI from the aggressor UEs as reported by the victim UE, the base station may schedule the resources for use by the victim UE and by the aggressor UE to reduce CLI.

BRIEF DESCRIPTION OF THE DRAWINGS

The present invention is illustrated by way of example and not limitation in the figures of the accompanying drawings in which like references indicate similar elements.

FIG. 8A depicts a scenario in which a victim UE receives from the base station an indication of CLI-impacted downlink symbols directed to a group of victim UEs for the victim UE to treated these downlink symbols differently from other downlink symbols, according to one aspect of the disclosure.

FIG. 8B depicts a scenario in which a victim UE receives from the base station an indication of CLI-impacted downlink symbols directed only to the victim UE for the victim UE to treated these downlink symbols differently from other downlink symbols, according to one aspect of the disclosure.

DETAILED DESCRIPTION

Figure 1:
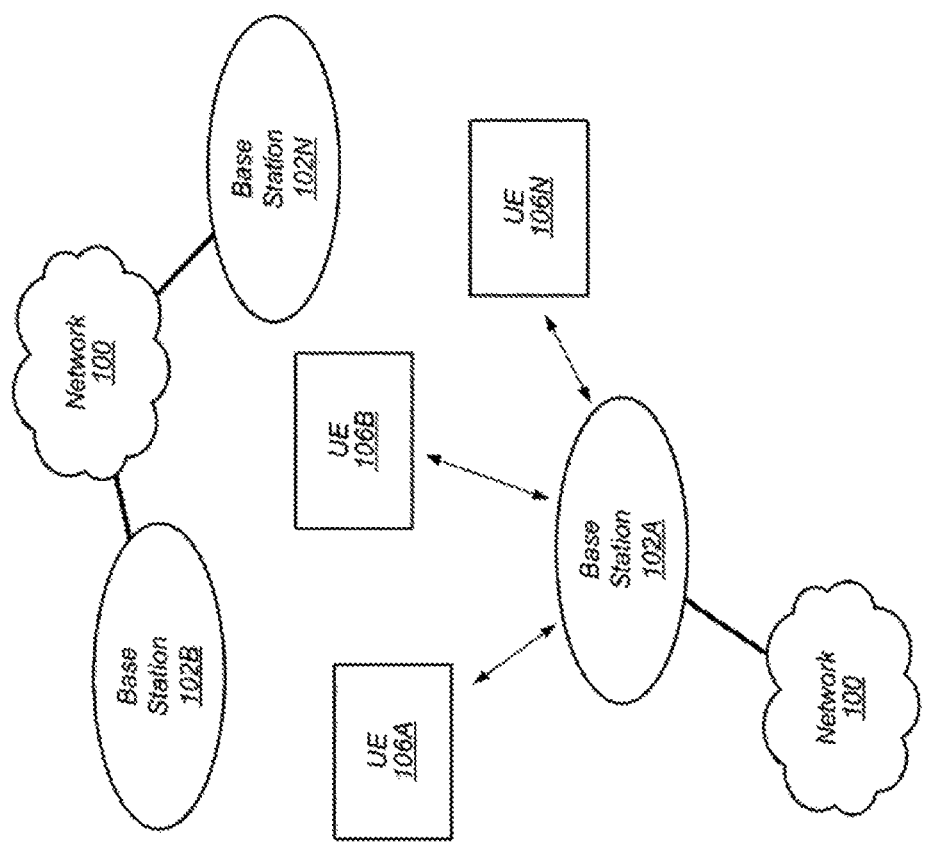
FIG. 1 illustrates an example wireless communication system according to one aspect of the disclosure.

Methods and systems are disclosed for signaling, configuration, and reporting between a full-duplex base station and UEs for the base station to manage and the UEs to measure intra-cell UE-to-UE CLI. The base station may operate in full-duplex FDD mode to receive transmission from UEs on an uplink sub-band while simultaneously transmitting to other UEs on a downlink sub-band. The two sub-bands may be non-overlapping, partially-overlapping, or fully-overlapping. Transmitting UEs and receiving UEs may be spatially separated to minimize interference but depending on the spatial separation between UEs, frequency separation between the sub-bands, and the priority of resource allocation between the transmitting UEs and receiving UEs performed by the base station, intra-cell UE-to-UE CLI may arise. The base station may signal victim UEs to measure the CLI on radio resources allocated to potential aggressor UEs for transmitting uplink traffic or transmitting uplink reference signals. The victim UEs may measure the CLI on the radio resources and may report the CLI measurements to the base station. With knowledge of the resources allocated to the potential aggressor UEs, the base station may identify the aggressor UEs likely to interfere with the victim UEs based on the CLI measurements made on the resources reported by the victim UEs and may adjust the resource allocation between the victim and aggressor UEs to reduce CLI.

In one aspect, the base station may signal to the victim UE resource identification information to indicate that the uplink reference signals used for making the CLI measurements are associate with one or more aggressor UEs. The victim UE may report the CLI measurements and the aggressor UEs associated with the measured reference signals to the base station for the base station to identify the aggressor UEs interfering with the victim UE. In one aspect, the base station may signal to the victim UE which downlink symbols may be impacted by CLI from aggressor UEs after downlink resources have already been scheduled for the victim UE. The victim UE may receive the downlink symbols using the allocated downlink resources and may exclude the CLI-impacted symbols from further processing.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

FIG. 1 illustrates a simplified example wireless communication system according to one aspect of the disclosure. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
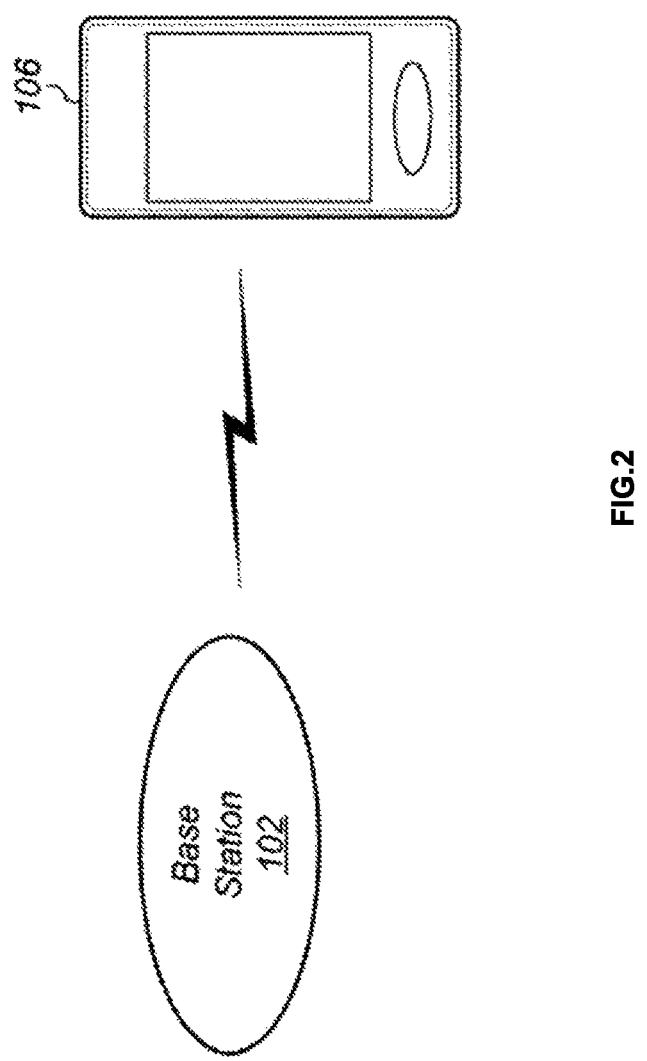
FIG. 2 illustrates user equipment in direct communication with a base station (BS) according to one aspect of the disclosure.

FIG. 2 illustrates a UE 106 in direct communication with a base station 102 through uplink and downlink communications according to one aspect of the disclosure. The UE 106 may be a device with cellular communication capability such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
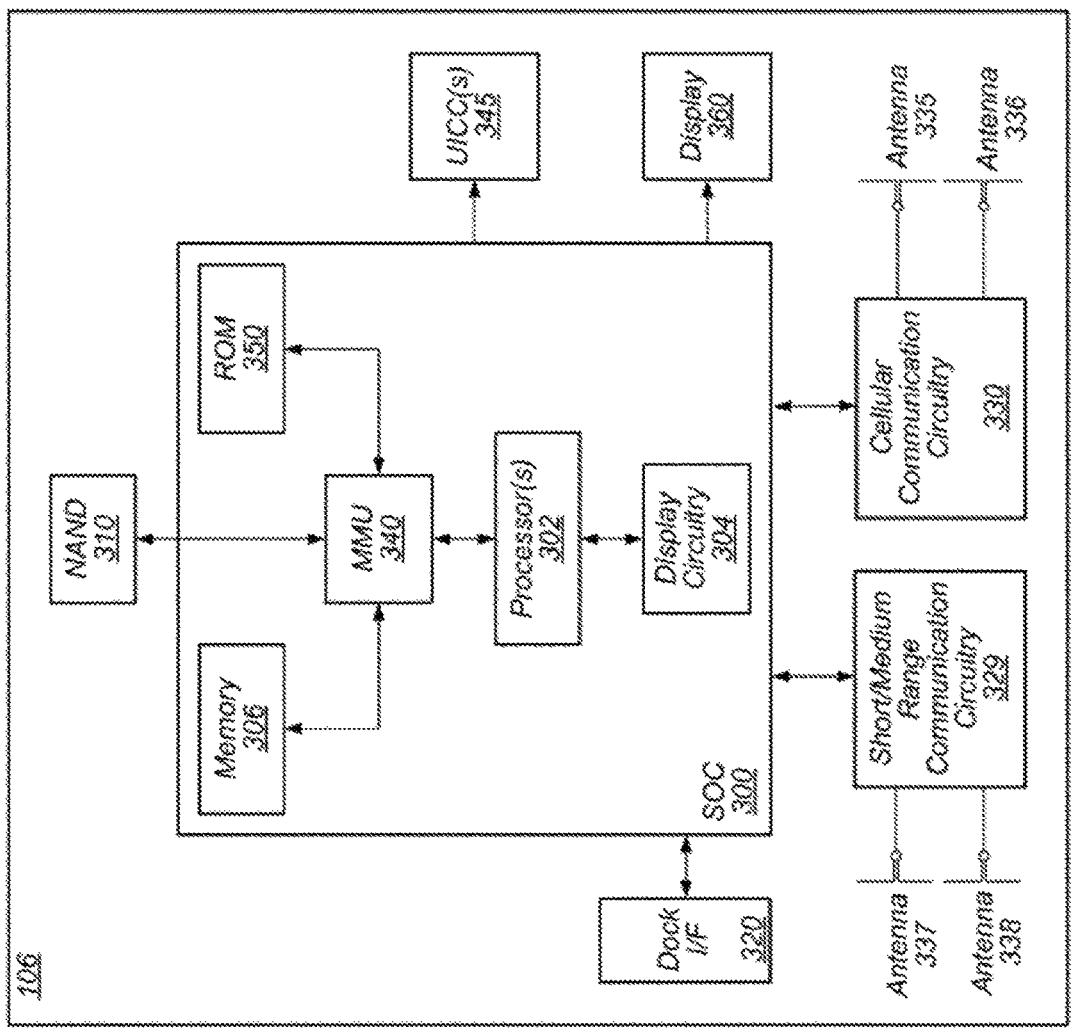
FIG. 3 illustrates an example block diagram of a UE according to one aspect of the disclosure.

FIG. 3 illustrates an example simplified block diagram of a communication device 106 according to one aspect of the disclosure. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs (component carriers) from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition), the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
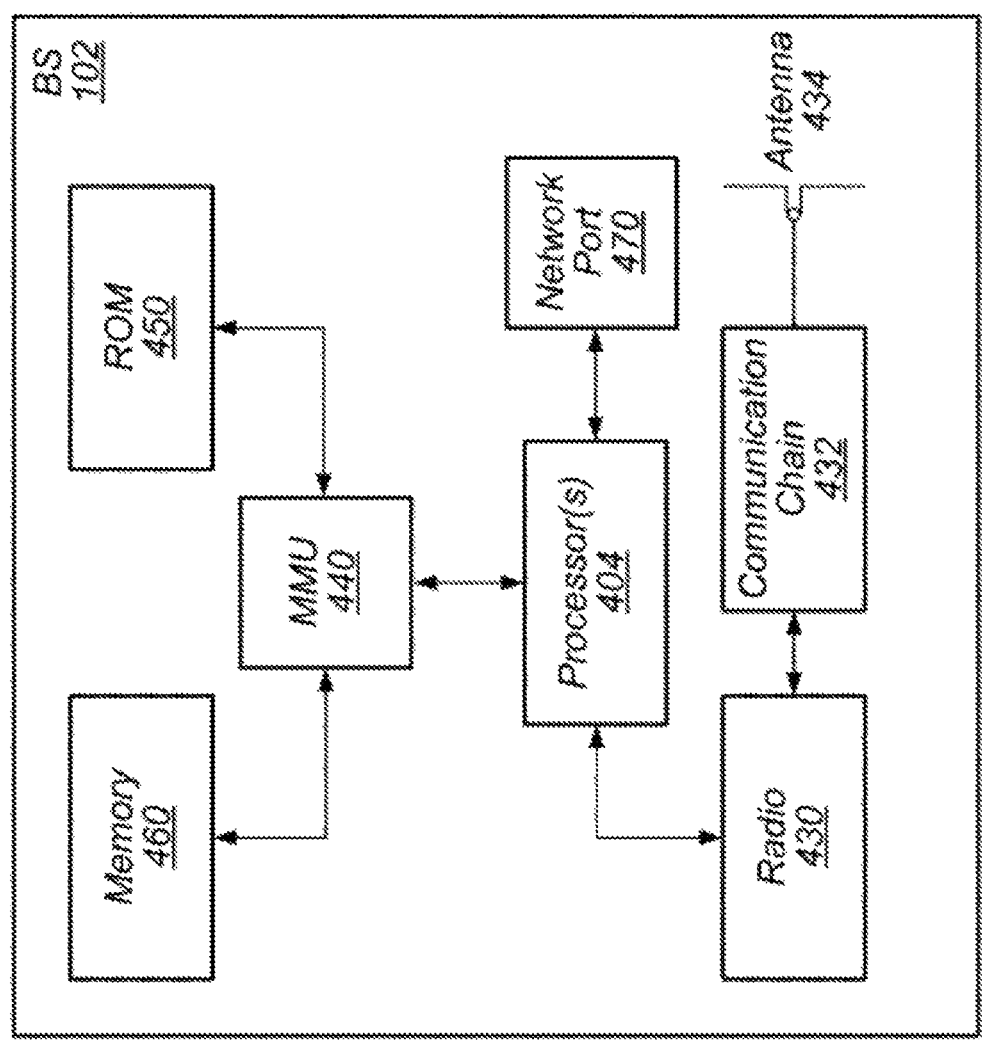
FIG. 4 illustrates an example block diagram of a BS according to one aspect of the disclosure.

FIG. 4 illustrates an example block diagram of a base station 102 according to one aspect of the disclosure. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UEs 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UEs 106. In some cases, the network port 470 may couple to a telephone network via the core network, and/or the core network may provide a telephone network (e.g., among other UEs serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UEs 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
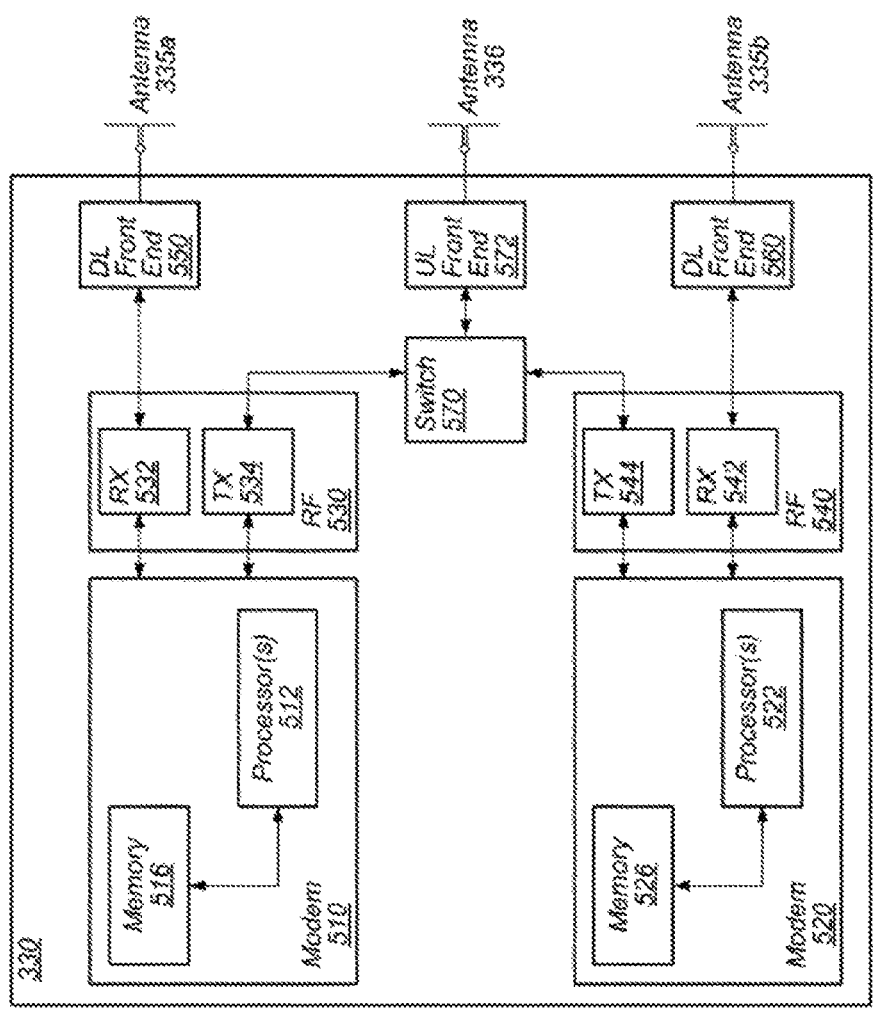
FIG. 5 illustrates an example block diagram of cellular communication circuitry according to one aspect of the disclosure.

FIG. 5 illustrates an example simplified block diagram of cellular communication circuitry according to one aspect of the disclosure. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 *a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for selecting a periodic resource part for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition), the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for selecting a periodic resource on a wireless link between a UE and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition), the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6:
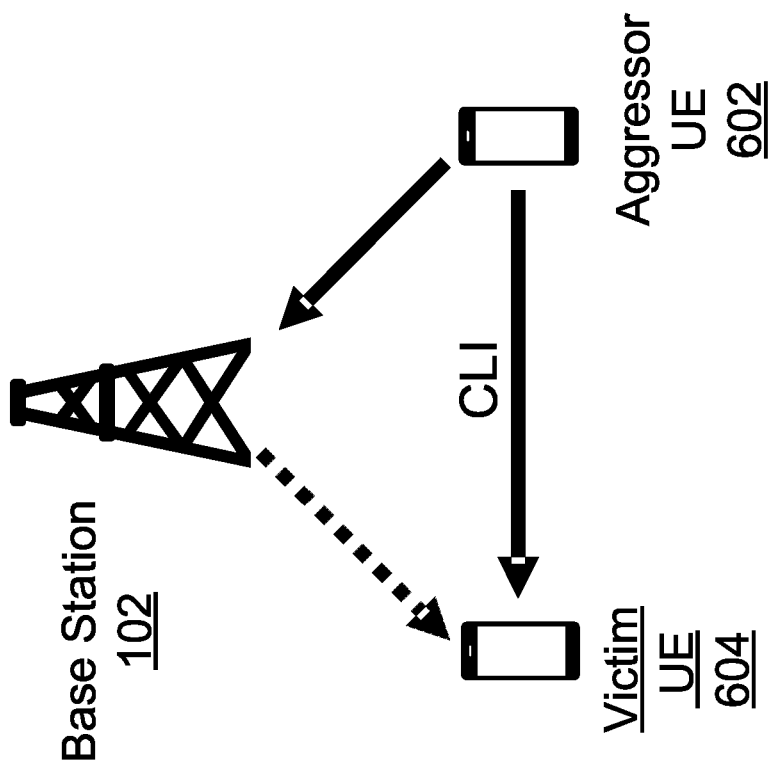
FIG. 6 depicts a scenario of intra-cell UE-to-UE CLI when a base station is operating in full-duplex mode, according to one aspect of the disclosure.

FIG. 6 depicts a scenario of intra-cell UE-to-UE CLI when a base station 102 is operating in full-duplex mode, according to one aspect of the disclosure. The base station 102 may be a gNB in 5G. The base station 102 may be connected to a EPC network and/or to a NRC network. In one aspect, the base station 102 may be considered a 5G NR cell and may include one or more transition and reception points (TRPs). The base station 102 may operate in full-duplex FDD mode with some of the UEs served by the base station transmitting in the uplink direction while simultaneously other UEs served by the base station are receiving in the downlink direction. The UEs may operate in half-duplex mode, but is not so limited as aspects of the disclosure may apply to UEs operating in full-duplex mode.

An aggressor UE 602 transmitting uplink is shown as causing intra-cell UE-to-UE CLI to a victim UE 604 that is receiving downlink. While only one aggressor UE and one victim UE is shown, it is understood that a victim UE may receive CLI from a group of aggressor UEs or that an aggressor UE may cause CLI to a group of victim UEs. Signaling between the base station 102 and the victim UE 604 and aggressor UE 602, and signaling between the victim UE 604 and aggressor UE 602 may be used to measure the CLI, identify which UEs are aggressor or victim, identify the desired or prohibited beams, and for the base station 102 to allocate the uplink and downlink resources to minimize or reduce CLI between aggressor UE 602 and victim UE 604. In one aspect, when the base station 102 schedules the resources for use by the victim UE 604 after having already scheduled the resources for use by one or more aggressor UEs 602, the base station may indicate to the victim UE 604 the resources for making CLI measurements. The downlink control information (DCI) used by the base station packet scheduler to allocate downlink resources (physical downlink shared channel (PDSCH)) and uplink resources (physical uplink shared channel (PUSCH)) may indicate to the victim UE there is an interferer (e.g., aggressor UE). In one aspect, the indication may be explicit by configuring additional bits in the DCI or may be implicit through activation of null-tones for CLI measurement.

The null tones may be reserved resources used to indicate that specific resource elements are not available for reception of the PDSCH by the victim UE. In one aspect, the null tones for CLI measurement may be configured from the reserved resources or some of the zero power channel state information reference signal (ZP-CSI-RS) may be activated for CLI measurement. ZP-CSI-RS is a category of CSI RS used within the context of reserved resources. A ZP-CSI-RS may define a set of resource elements that do not contain any transmission for the victim UE 604. In one aspect, the PDSCH may be rate matched around the null tones or the ZP-CSI-RS. In one aspect, some of the existing ZP-CSI-RS resources are configured for UE-to-UE CLI measurement (e.g., inter-cell interference), so when the bit-field in the DCI activates or selects the one of these ZP CSI-RS resources, the base station 102 is signaling to the victim UE 604 implicitly that there may be one or more aggressor UEs (e.g., intra-cell or inter-cell).

In one aspect, the DCI may further indicate which downlink symbols received in the PDSCH for the victim UE 604 may experience CLI. For example, if the starting symbol of the resource allocation and the number of allocated symbols (e.g., the starting symbol and length indicator value (SLIV) encoded by the DCI) for the victim UE 604 does not lie entirely within the SLIV of the aggressor UE 602, there may be an imbalance in the interference and in the CLI measurement among the downlink symbols. Alternatively, the victim UE 604 does not expect to observe imbalance in the interference if the SLIV for the victim UE 604 lies entirely within the SLIC of the aggressor UE 602. In this case, the victim UE 604 may assume all symbols in the SLIV experience the same or similar interference plus noise covariance matrix.

Once the base station 102 signals to the victim UE 604 that there is an interferer indicated by the DCI, the victim UE 604 may measure the CLI using the null-tones or the ZP-CSI-RS and may report the CLI measurement on the physical uplink control chancel (PUCCH) as indicated by the DCI. In one aspect, the base station 102 may indicate to the victim UE 604 through higher layer signaling such as radio resource control (RRC) or through more dynamic lower layer signaling the parameters or metrics of the CLI to be measured and reported associated with the null tones or ZP-CSI-RS. In one aspect, the parameters may include received signal strength indicator (RSSI), reference signal received power (RSRP), signal to interference plus noise ratio (SINR), etc. In one aspect, different null-tones or ZP-CSI-RS may be configured to provide different metrics or parameters used to characterize the CLI. The victim UE 604 may be configured to measure the parameters of the CLI or may know the parameters to measure based on the configuration of the null-tones or ZP-CSI-RS once they are activated.

Figure 7A:
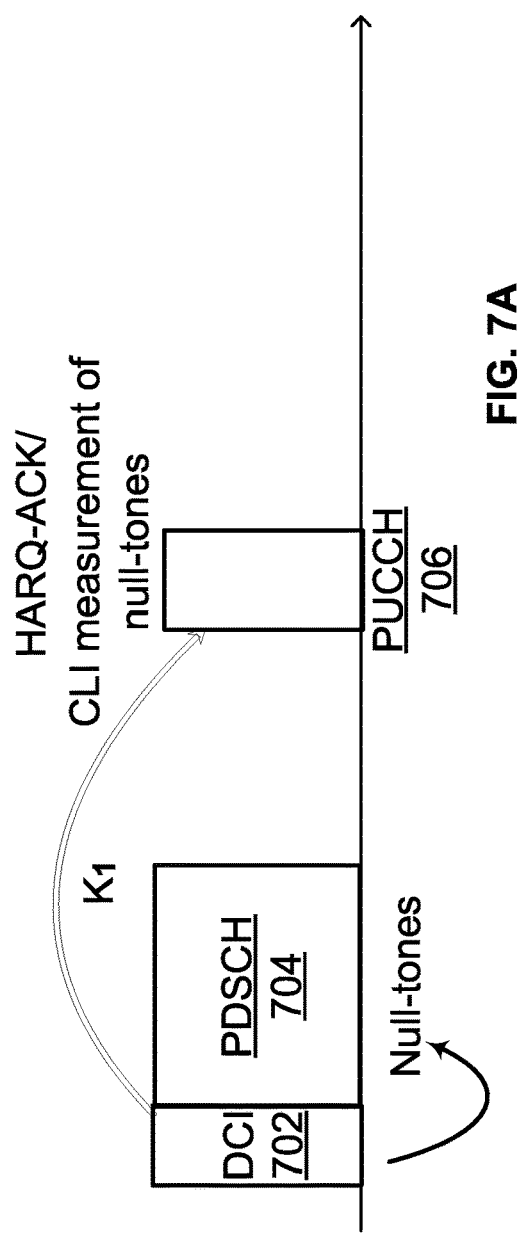
FIG. 7A depicts a scenario in which a victim UE measures null tones during downlink reception to determine the level of CLI and reports the CLI measurement to the base station using the same uplink resource used for signaling whether received downlink packet has errors, according to one aspect of the disclosure.

FIG. 7A depicts a scenario in which a victim UE measures null tones during downlink reception to determine the level of CLI and reports the CLI measurement to the base station using the same uplink resource used for signaling whether received downlink packet has errors, according to one aspect of the disclosure. In FIG. 7A, the DCI 702 may allocate the downlink resources for PDSCH 704 and may configure null-tones or activate ZP-CSI-RS for the victim UE to make CLI measurements. The DCI 702 may be carried on physical downlink control channel (PDCCH).

The victim UE may report the CLI measurement to the base station using the same PUCCH 706 as allocated by the DCI 702 for reporting errors within the received data in the PDSCH 704 using the hybrid automatic repeat request-acknowledge (HARQ-ACK) retransmission protocol. The DCI 702 may configure the time (Nx) between the last symbol of the PDSCH 704 and the first symbol of the PUCCH 706 to accommodate the victim UE's processing capability so it may make the CLI measurement, process the PDSCH, and provide the HARQ-ACQ and channel state information (CSI) feedback containing the CLI measurement on the PUCCH 706 within the configured time Nx. In one aspect, the DCI 702 may configure the PDSCH 704 to HARQ feedback timing indicator ($K_1$) that determines the number of slots between the reception of the PDSCH 704 and the transmission of the HARQ-ACK to accommodate the victim UE's processing capability.

Figure 7B:
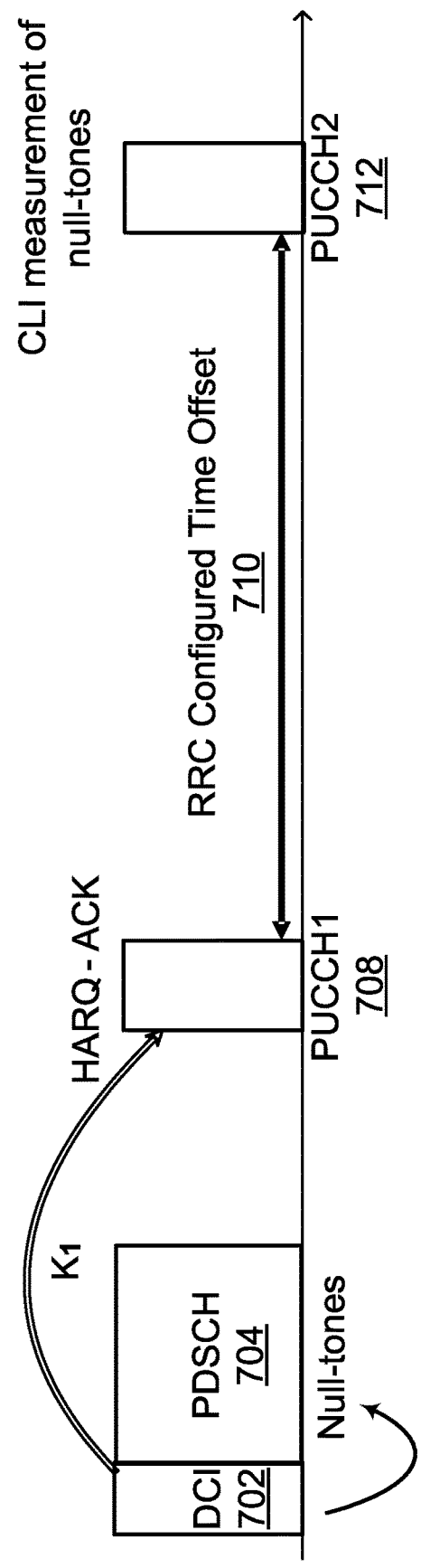
FIG. 7B depicts a scenario in which a victim UE measures null tones during downlink reception to determine the level of CLI and reports the CLI measurement to the base station using a different uplink resource from the uplink resource used for signaling whether received downlink packet has errors, according to one aspect of the disclosure.

FIG. 7B depicts a scenario in which a victim UE measures null tones during downlink reception to determine the level of CLI and reports the CLI measurement to the base station using a different uplink resource from the uplink resource used for signaling whether received downlink packet has errors, according to one aspect of the disclosure.

The DCI 702 may configure the PUCCH resource indicator (PRI) to use PUCCH1 708 to return the HARQ-ACK for reporting errors within the received data in the PDSCH 704. The base station may use RRC to configure a time offset 710 from PUCCH1 708 to a second PUCCH, PUCCH2 712, used by the victim UE to report the CSI for the CLI measurement. The RRC configured time offset 710 may provide flexibility for the timing of the PUCCH2 712 used to report CLI measurement as a function of the processing capability of the victim UE if the victim UE cannot make the CLI measurement and provide the CSI feedback within Nx. The base station may receive the CLI measurements associated with the null tones or the ZP-CSI-RS. Based on the CLI measurements, the base station may adjust its scheduling of future downlink resources PDSCH for the victim UE to reduce or minimize CLI.

In one aspect, when the base station has already scheduled the resources for use by the victim UE for PDSCH before scheduling or having knowledge of the resources requested for use by one or more aggressor UEs, the base station is not able to stop the victim UE from receiving downlink symbols using the scheduled resources but may indicate to the victim UE which downlink symbols may be impacted by CLI from possible aggressor UEs. The base station may use a periodic group-cast DCI (GC-DCI) directed to a group of victim UEs or a unicast DCI directed to a specific victim UE to indicate which symbols may be impacted by CLI in view of the uplink resources allocated for possible aggressor UEs. In one aspect, the group-cast CDI or unicast DCI may be received by the victim UE after the latest DCI scheduling the PDSCH being impacted by the CLI.

FIG. 8A depicts a scenario in which a victim UE receives from the base station periodic group-cast DCI carrying indications of CLI-impacted downlink symbols directed to a group of victim UEs for the victim UE to treated these downlink symbols differently from other downlink symbols, according to one aspect of the disclosure. In one aspect, the group-cast DCI 806 is received after the DCI 802 has scheduled the PDSCH 804 and may include a bit-map covering the downlink symbols from the last symbol of the PDCCH carrying the previous group-cast DCI 808 containing the previous indication 810 of CLI-impacted downlink symbols until the last symbol of the PDCCH carrying the latest group-cast DCI 806 containing the latest indication 812 of CLI-impacted downlink symbols.

In one aspect, cell-specific symbols indicated as uplink symbols by the tdd-UL-UL-ConfigurationCommon parameter broadcast as part of system information block 1 (SIB1) on the PDSCH may be excluded from the downlink symbols covered by the bit-map of the group-cast DCI. The reason is that the victim UE does not expect downlink allocation during the transmission of these cell-specific uplink symbols. In one aspect, synchronization signal block (SSB) symbols may be excluded from the downlink symbols covered by the bit-map of the group-cast DCI as well because the victim UE does not expect uplink allocation during the transmission of the SSB symbols. The bit-map may thus cover CLI-impacted downlink symbols after excluding the cell-specific uplink symbols and the SSB symbols, reducing the size of the bit-map. For example, if the size of the bit-map is 14 bits and the number of CLI-impacted downlink symbols to be covered is 28 bits, each bit of the bit-map may be mapped to 2 downlink symbols.

FIG. 8B depicts a scenario in which a victim UE receives from the base station unicast DCI 826 carrying an indication 828 of CLI-impacted downlink symbols directed only to the victim UE for the victim UE to treated these downlink symbols differently from other downlink symbols, according to one aspect of the disclosure. In one aspect, the unicast DCI may include a bit-map covering the downlink symbols given by SLIV 830 configured by the latest DCI 822 scheduling the PDSCH 824 impacted by CLI.

Compared to the group-cast DCI 806, the size of the bit-map for the unicast DCI 826 may be smaller due to fewer number of CLI-impacted downlink symbols to cover. For example, the size of the bit-map may be 2 bits to cover 6 PDSCH symbols, with each bit mapped to 3 downlink symbols. However, there may be more overhead associated with configuring a unicast DCI for each victim UE compared with configuring a group-cast DCI for a group of victim UEs. In either the group-cast DCI or the unicast, the victim UE may receive the downlink symbols of the PDSCH to determine if the symbols are corrupted or may exclude the CLI-impacted symbols indicated by the bit-map from further processing.

In one aspect, when the base station is able to schedule the resources for use by the victim UE and by the aggressor UE concurrently, the base station may coordinate the transmission of reference signals by one or more aggressor UEs and the measurement of the reference signals by one or more victim UEs to determine the level of CLI before allocating any resource for the victim UEs and aggressor UEs. In one aspect, the reference signals may be sounding reference signals (SRS) transmitted by UEs for the base station to measure the uplink channel characteristics. The base station may configure one or more aggressor UEs to transmit the SRS and may configure one or more victim UEs to measure and report the CLI using the SRS.

In one aspect, the base station may configure the aggressor UEs and the victim UEs with a common set of SRS resources. In one aspect, for non-overlapping sub-bands, the set of SRS resources configured for the aggressor UEs may not be in the active downlink bandwidth parts (DL_BWP) of the victim UEs. The DL-BWP may contain contiguous common resource blocks within a channel bandwidth. The victim UEs may then perform leakage measurement of parameters of the CLI such as the RSRP over the configured SRS resources.

The aggressor UEs may transmit the SRS on a periodic, semi-persistent, or aperiodic basis. In one aspect, an aggressor UE may be configured by DCI to transmit aperiodic SRS resources and a victim UE may be configured by DCI to measure parameters such as RSRP, SINR, etc., over the aperiodic SRS resources. In one aspect, the base station may configure the aggressor UEs to activate the SRS resources and the victim UEs to measure the SRS resources through a joint indication such as a group-cast DCI. In one aspect, the base station may configure the aggressor UEs to activate the SRS resources and the victim UEs to measure the SRS resources through separate group-cast DCI, one for the aggressor UEs to active the SRS transmission and one for the victim UEs to indicate the measurement and reporting of CLI parameters over the SRS resources transmitted by the aggressor UEs.

In one aspect, the aggressor UEs may transmit periodic or semi-persistent SRS resources without requiring activation through DCI. The victim UEs may perform periodic or aperiodic CLI measurements over the periodic or semi-persistent SRS resources. In one aspect, aperiodic measurements may be activated through DCI or triggered upon the occurrence of triggering events such as when there is a high NACK rate, high level of interference, etc.

In one aspect, the base station may indicate to the victim UE resource identification information that associates the SRS resources with one or more aggressor UEs. The victim UE may measure the parameters of the CLI over the SRS resources and may report the CLI measurement and the aggressor UEs associated with the measured SRS to the base station on PUCCH or PUSCH. Based on the level of CLI from the aggressor UEs as reported by the victim UEs, the base station may schedule the resources for use by the victim UEs and by the aggressor UEs to reduce CLI.

Figure 9:
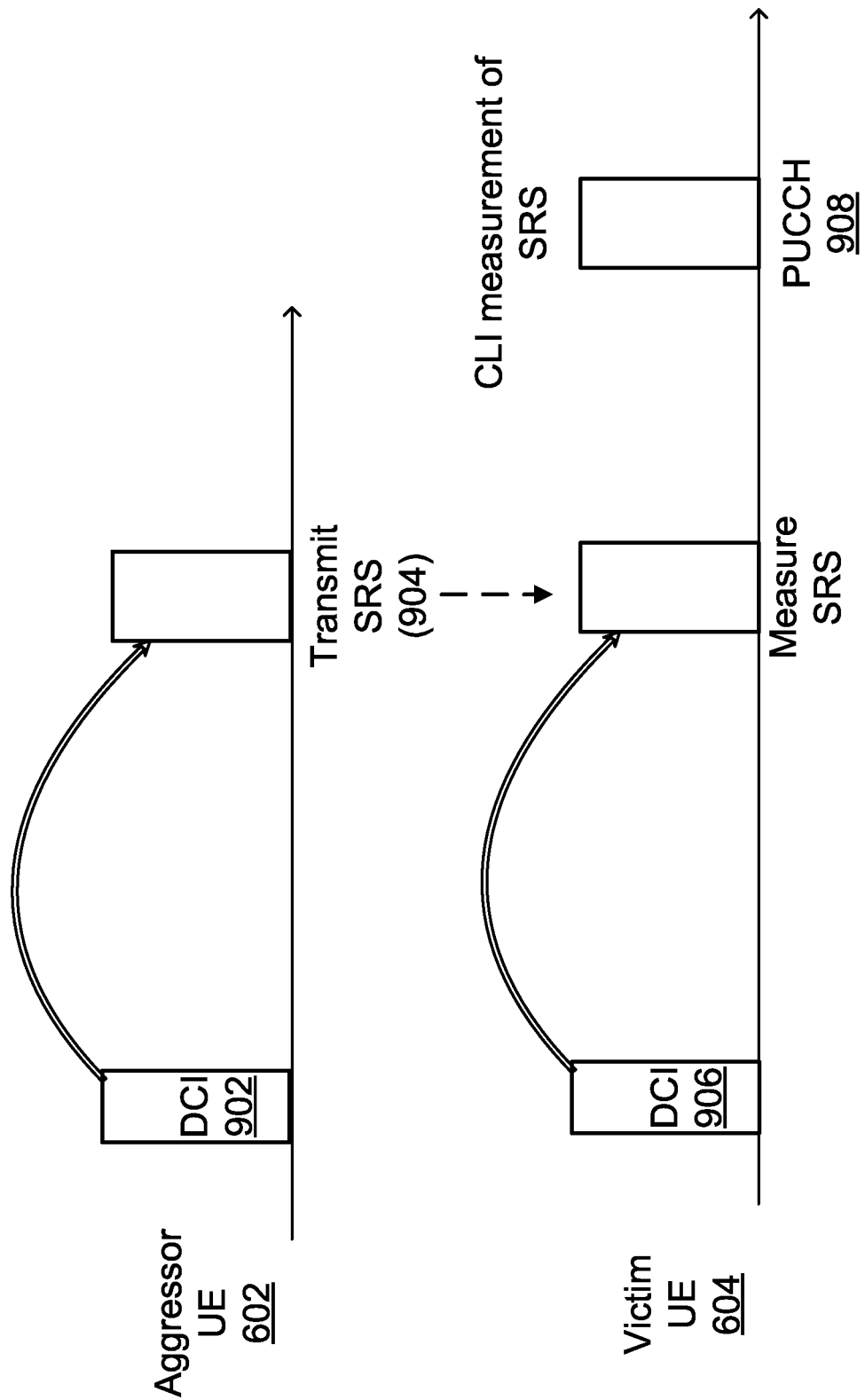
FIG. 9 depicts a scenario in which an aggressor UE is configured to transmit sounding reference signals (SRS) and a victim UE is configured to measure the SRS to determine the level of CLI from the aggressor UE and to report the CLI measurement to the base station, according to one aspect of the disclosure.

FIG. 9 depicts a scenario in which an aggressor 602 UE is configured to transmit SRS resources and a victim UE 604 is configured to measure the SRS resources to determine the level of CLI from the aggressor UE 602 and to report the CLI measurement to the base station, according to one aspect of the disclosure. The base station may configure the DCI 902 to activate the aggressor UE 602 to transmit the SRS resources 904. The base station may configure the same DCI or a different DCI 906 to indicate to the victim UE 604 to measure and report CLI parameters over the SRS resources 904 transmitted by the aggressor UE 602. The DCI may include resource identification information that associates the SRS resources 904 to be measured with the aggressor UE 602. The victim UE 604 may measure the parameters of the CLI over the SRS resources 904 and may report the CLI measurement and the aggressor UEs 602 associated with the measured SRS to the base station on PUCCH 908.

Figure 10:
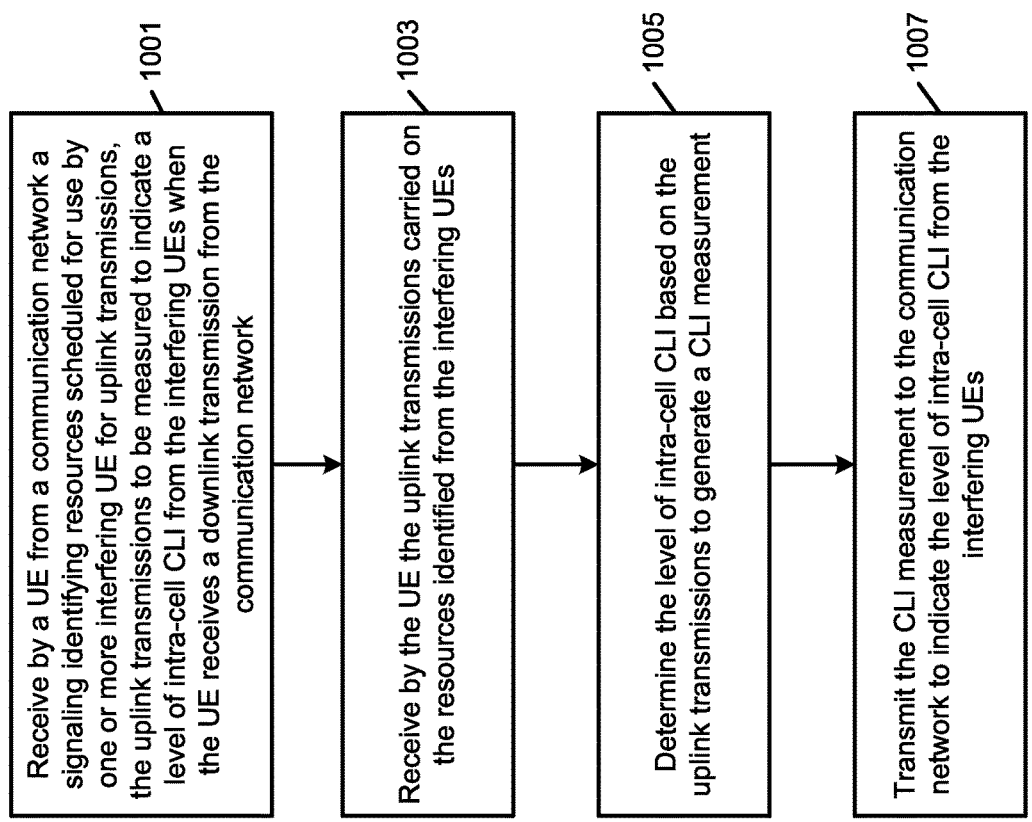
FIG. 10 depicts a flow diagram of a method for a victim UE to perform measurement of intra-cell UE-to-UE CLI using resources configured for uplink transmission from one or more aggressor UEs and to report the CLI measurement, according to one aspect of the disclosure.

FIG. 10 depicts a flow diagram of a method 1000 for a victim UE to perform measurement of intra-cell UE-to-UE CLI using resources configured for uplink transmission from one or more aggressor UEs and to report the CLI measurement, according to one aspect of the disclosure. Method 1000 may be practiced by the UE of FIG. 1, 2, 3, 5, 6, 7, 8, or 9.

In operation 1001, the victim UE receives from a base station of a communication network a signaling identifying resources scheduled for use by one or more aggressor UEs for uplink transmissions. The uplink transmissions by the aggressor UEs may be measured to indicate a level of intra-cell CLI from the aggressor UEs on the victim UE when the UE receives downlink transmissions from the communication network.

In operation 1003, the victim UE receives the uplink transmissions carried on the identified resources from the interfering UEs.

In operation 1005, the victim UE determines the level of intra-cell CLI based on the uplink transmissions to generate a CLI measurement.

In operation 1007, the victim UE transmits the CLI measurement to the communication network to indicate the level of intra-cell CLI from the interfering UEs.

Figure 11:
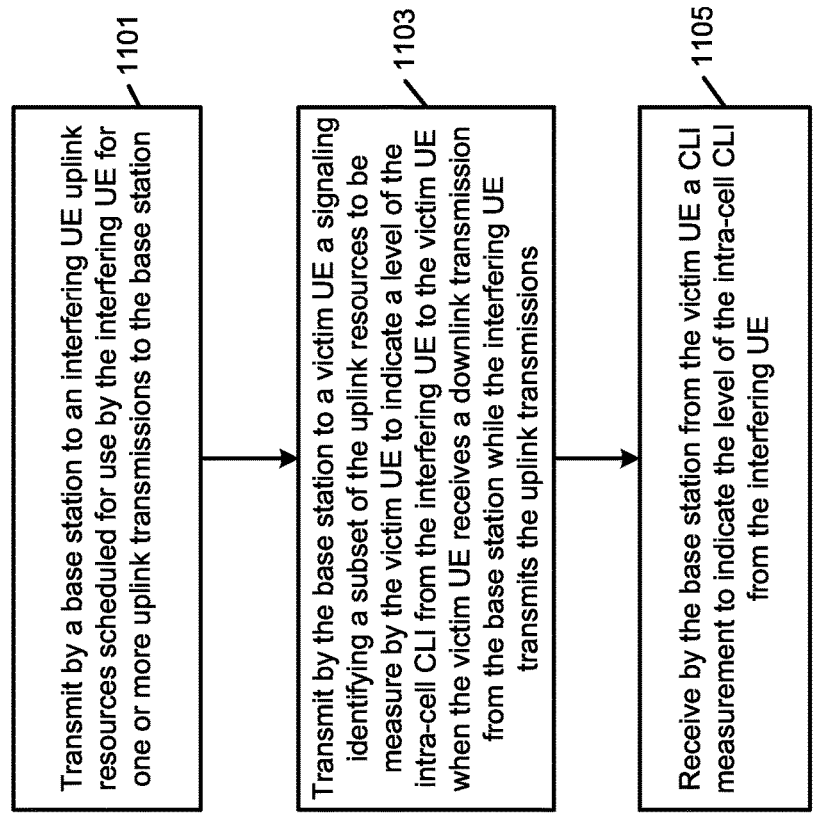
FIG. 11 depicts a flow diagram of a method for a base station to manage intra-cell UE-to-UE CLI by configuring potential aggressor UEs to transmit and by configuring potential victim UEs to measure a subset of the uplink resources allocated to the aggressor UEs and to report CLI measurement results, according to one aspect of the disclosure.

FIG. 11 depicts a flow diagram of a method 1100 for a base station of a communication network to manage intra-cell UE-to-UE CLI by configuring potential aggressor UEs to transmit and by configuring potential victim UEs to measure a subset of the uplink resources allocated to the aggressor UEs and to report CLI measurement results, according to one aspect of the disclosure. Method 1000 may be practiced by the base station of FIG. 1, 2, 4, or 6.

In operation 1101, the base station transmits to an interfering UE, also referred to as an aggressor UE, uplink resources scheduled for use by the interfering UE for uplink transmissions to the base station.

In operation 1103, the base station transmits to a victim UE a signaling to identify a subset of the uplink resources to be measure by the victim UE to indicate a level of the expected intra-cell CLI from the interfering UE to the victim UE when the victim UE is receiving a downlink transmission from the base station while the interfering UE transmits the uplink transmissions.

In operation 1105, the base station receives from the victim UE results of the CLI measurement to indicate the level of the intra-cell CLI from the interfering UE.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A baseband processor of a wireless user equipment (UE) of a communication network exposed to intra-cell cross link interference (CLI) comprising:
   receiving, from the communication network, a signaling identifying resources scheduled for use by one or more interfering UEs of the communication network for one or more uplink transmissions, the uplink transmissions to be measured to indicate a level of the intra-cell CLI from the interfering UEs when the UE receives a downlink transmission from the communication network;
   receiving, from the interfering UEs, the uplink transmissions carried on the resources identified;
   determining the level of the intra-cell CLI based on the uplink transmissions to generate a CLI measurement; and
   transmitting the CLI measurement to the communication network to indicate the level of the intra-cell CLI from the interfering UEs,
   wherein transmitting the CLI measurement to the communication network comprises transmitting the CLI measurements using a same uplink resource allocated to the UE to transmit an acknowledgement that the downlink transmission is received in error.

2. The baseband processor of claim 1, wherein the signaling comprises an indication to activate timing and frequency resources configured to carry one or more null-tones reserved for the CLI measurement or one or more reference signals to be used for measuring the CLI, and wherein determining the level of the intra-cell CLI comprises the UE measuring the level of the intra-cell CLI using the null-tones or the reference signals.

3. The baseband processor of claim 1, wherein the signaling further comprises an identification of one or more symbols in the downlink transmission likely to be affected by the intra-cell CLI.

4. The baseband processor of claim 1, further comprising:
   receiving, from the communication network, one or more parameters of the uplink transmissions to be measured, wherein the parameters of the uplink transmissions comprise one or more of a received signal strength indicator (RSSI), a reference signal received power (RSRP), or a signal to interference plus noise ratio (SINR).

5. The baseband processor of claim 1, further comprising:
   receiving, from the communication network, a timing offset between a first uplink resource allocated to the UE to transmit an acknowledgement that the downlink transmission is received in error and a second uplink resource allocated to the UE to transmit the CLI measurement.

6. The baseband processor of claim 5, wherein transmitting the CLI measurement to the communication network comprises transmitting the CLI measurements using the second uplink resource.

7. The baseband processor of claim 1, wherein the signaling comprises an indication for the UE to measure reference signals transmitted by the interfering UEs, wherein the reference signals are used by the communication network to measure characteristics of channels for the uplink transmissions from the interfering UEs.

8. The baseband processor of claim 7, wherein the signaling further comprises resource identification information that associates the reference signals to be measured with one or more of the interfering UEs.

9. The baseband processor of claim 7, wherein the signaling further comprises an indication to the UE to measure parameters of the reference signals on an aperiodic basis.

10. A baseband processor of a wireless user equipment (UE) of a communication network exposed to intra-cell cross link interference (CLI) comprising:
   receiving, from the communication network, resources allocated for use by the UE to receive a downlink transmission from the communication network;
   receiving, from the communication network, a signaling identifying one or more symbols in the downlink transmission likely to be affected by the intra-cell CLI caused by one or more uplink transmissions from one or more interfering UEs of the communication network;
   receiving, from the communication network, the downlink transmission carried on the resources allocated; and
   processing the downlink transmission to exclude the one or more symbols identified as likely to be affected by the intra-cell CLI,
   wherein the plurality of the symbols excludes cell-specific uplink symbols specific to a cell of the communication network and excludes downlink synchronization symbols, wherein uplink resources allocated by the communication network to transmit the cell-specific uplink symbols preclude allocating the uplink resources for the downlink transmission, and wherein downlink resources allocated by the communication network to transmit the downlink synchronization symbols preclude allocating the downlink resources for an uplink transmission.

11. The baseband processor of claim 10, wherein the signaling comprises a bit-map covering a plurality of the symbols in the downlink transmission since a previous signaling was received identifying one or more symbols in a previous downlink transmission likely to be affected by the intra-cell CLI.

12. The baseband processor of claim 10, wherein the signaling comprises a bit-map covering all of the symbols in the downlink transmission received on the resources allocated.

13. A user equipment (UE) comprising:
at least one antenna;
at least one radio, wherein the at least one radio is configured to communicate with a communication network using the at least one antenna; and
at least one processor coupled to the at least one radio, wherein the at least one processor is configured to perform operations comprising:
receive from the communication network a signaling identifying resources scheduled for use by one or more interfering UEs of the communication network for one or more uplink transmissions, the uplink transmissions to be measured to indicate a level of intra-cell cross link interference (CLI) from the interfering UEs to the UE when the UE receives a downlink transmission from the communication network;
receive from the interfering UEs the uplink transmissions carried on the resources identified;
determine the level of the intra-cell CLI based on the uplink transmissions to generate a CLI measurement; and
transmit the CLI measurement to the communication network to indicate the level of the intra-cell CLI from the interfering UEs to the UE,
wherein transmitting the CLI measurement to the communication network comprises transmitting the CLI measurements using a same uplink resource allocated to the UE to transmit an acknowledgement that the downlink transmission is received in error.

14. The UE of claim 13, wherein the signaling comprises an indication to activate timing and frequency resources configured to carry one or more null-tones reserved for the CLI measurement or one or more reference signals to be used for measuring the CLI, and wherein determining the level of the intra-cell CLI comprises the UE measuring the level of the intra-cell CLI using the null-tones or the reference signals.

15. The UE of claim 13, wherein the signaling further comprises an identification of one or more symbols in the downlink transmission likely to be affected by the intra-cell CLI.

16. A baseband processor of a base station of a communication network configured to manage intra-cell cross link interference (CLI) between a plurality of wireless user equipment (UE) of the communication network, comprising:
transmitting, to an interfering UE selected among the plurality of UEs, uplink resources scheduled for use by the interfering UE for one or more uplink transmissions to the base station;
transmitting, to a victim UE selected among the plurality of UE, a signaling identifying a subset of the uplink resources including one or more null-tones or reference signals to be measure by the victim UE to indicate a level of the intra-cell CLI from the interfering UE to the victim UE when the victim UE receives a downlink transmission from the base station while the interfering UE transmits the uplink transmissions; and
receiving, from the victim UE, a CLI measurement to indicate the level of the intra-cell CLI from the interfering UE,
wherein receiving the CLI measurement comprises receiving the CLI measurement using a same uplink resource allocated to the victim UE to transmit an acknowledgement that the downlink transmission is received in error.

17. The baseband processor of claim 16, further comprising:
transmitting, to the victim UE, a timing offset between a first uplink resource allocated to the victim UE to transmit an acknowledgement that the downlink transmission is received in error and a second uplink resource allocated to the victim UE to transmit the CLI measurement.

18. The baseband processor of claim 16, wherein the signaling comprises an indication for the victim UE to measure reference signals transmitted by the interfering UE, wherein the reference signals are received by the base station to measure characteristics of channels for the uplink transmissions from the interfering UE.

19. A baseband processor of a base station of a communication network configured to manage intra-cell cross link interference (CLI) between a plurality of wireless user equipment (UE) of the communication network, comprising:
transmitting, to a victim UE selected among the plurality of UE, resources allocated for use by the victim UE to receive a downlink transmission from the base station;
transmitting, to the victim UE, a signaling identifying one or more symbols in the downlink transmission likely to be affected by the intra-cell CLI caused by one or more uplink transmissions from one or more interfering UEs selected among the plurality of UE; and
transmitting, to the victim UE, the downlink transmission carried on the resources allocated to enable the victim UE to exclude the one or more symbols identified as likely to be affected by the intra-cell CLI,
wherein the one or more of the symbols excludes cell-specific uplink symbols specific to a cell of the communication network and excludes downlink synchronization symbols, wherein uplink resources allocated by the communication network to transmit the cell-specific uplink symbols preclude allocating the uplink resources for the downlink transmission, and wherein downlink resources allocated by the communication network to transmit the downlink synchronization symbols preclude allocating the downlink resources for an uplink transmission.

20. The baseband processor of claim 19, wherein the signaling comprises a bit-map covering all of the symbols in the downlink transmission received on the resources allocated.

* * * * *